United States Patent [19]
Jones et al.

[11] Patent Number: 6,137,802
[45] Date of Patent: *Oct. 24, 2000

[54] AUTOMATIC MEDIA SWITCHING APPARATUS AND METHOD

[75] Inventors: Wesley Stuart Jones, Schaumburg; Louis P. Dellaverson, Barrington, both of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,014

[22] Filed: Mar. 25, 1997

[51] Int. Cl.⁷ .................................................. H04M 11/00
[52] U.S. Cl. ........................ 370/401; 370/445; 370/463
[58] Field of Search .................................. 370/401, 402, 370/522, 463, 445, 338; 455/556, 557

[56] References Cited

U.S. PATENT DOCUMENTS

| | | | |
|---|---|---|---|
| 5,726,984 | 3/1998 | Kubler et al. | 370/338 |
| 5,748,619 | 5/1998 | Meier | 370/466 |
| 5,790,536 | 8/1998 | Mahany et al. | 370/338 |
| 5,844,893 | 12/1998 | Gollnick et al. | 370/338 |
| 5,915,002 | 6/1999 | Shimosako | 379/93.07 |

*Primary Examiner*—Chi H. Pham
*Assistant Examiner*—Frank Duong
*Attorney, Agent, or Firm*—Charles W. Bethards

[57] ABSTRACT

A media switching apparatus automatically switches a user device between wired and wireless service mediums of communications networks. The switching apparatus includes a protocol stack having a network layer, a logical link control, a first set of lower layers specific to a wired service medium and a second set of lower layers specific to a wireless service medium. A selector is responsive to the availability of a wired service medium for selecting the first set of lower layers and is further responsive to the non-availability of a wired service medium and the availability of a wireless service medium for selecting the second set of lower layers.

24 Claims, 6 Drawing Sheets

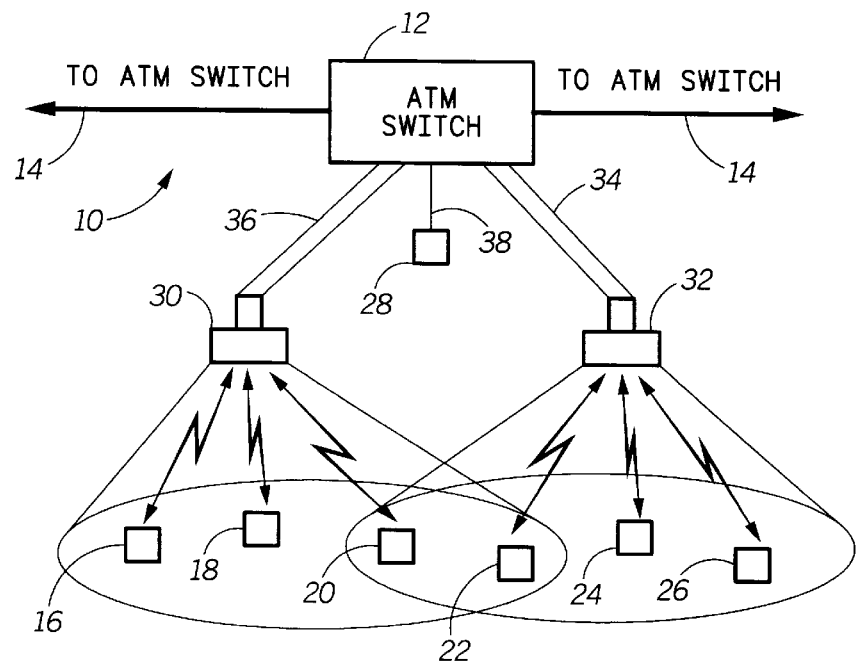
FIG. 1
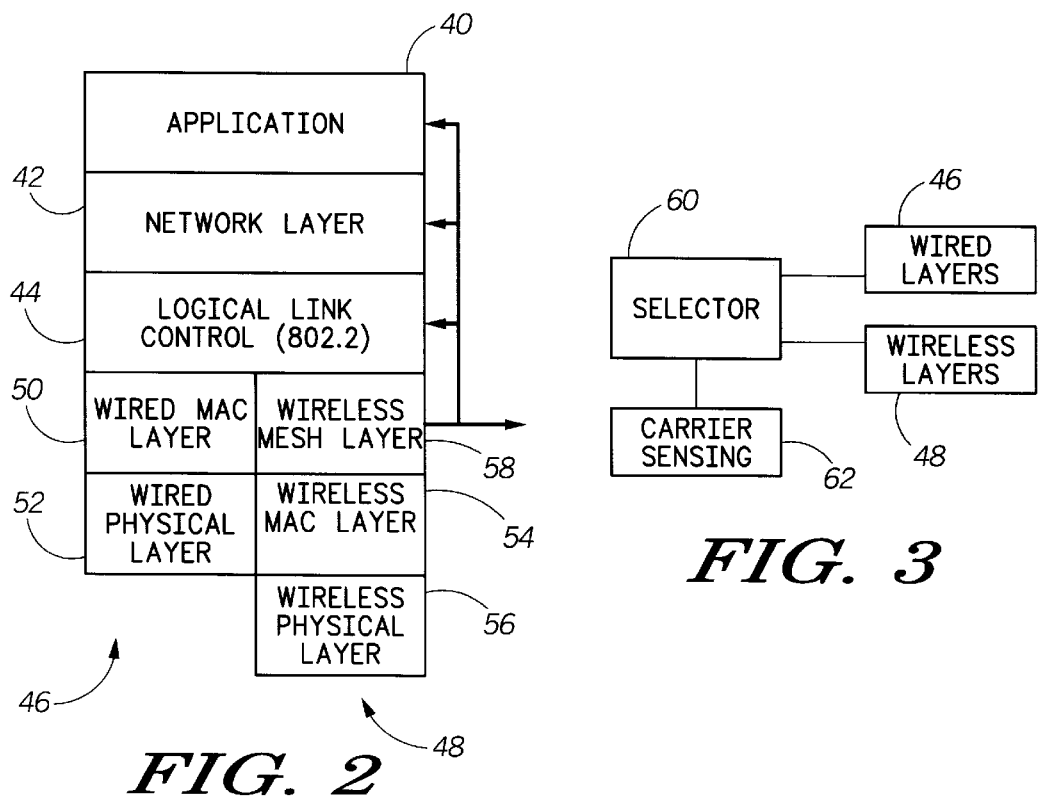
FIG. 2
FIG. 3

AUTOMATIC MEDIA SWITCHING APPARATUS AND METHOD

FIELD OF THE INVENTION

This invention is directed generally to the field of communications networks, and more particularly to a novel method and apparatus which permits automatic switching of a user device between wired and wireless service mediums of communications networks.

BACKGROUND OF THE INVENTION

Multimedia communications between two stations may use either wired or wireless communications networks. These wired networks may be either packet based, such as Ethernet, or circuit based networks such as asynchronous transfer mode (ATM). Such networks may exist in an office building or between office locations of the same company, for use by company employees. In the case of portable equipment such as a laptop computer, when the user is away from his own office, either within the company premises, or traveling, he may wish to make use of a wireless communication network to communicate with other devices, including devices on the wired company network. Similarly, it may be desirable under some circumstances even for stationary equipment such as the desktop computer to communicate over a wireless network with other devices.

In a wireless network, a high speed wired communications network (a backbone network) may communicate with a number of base stations, which in turn communicate with users of the network services by wireless connections. These networks may be based on ATM technology. Thus, a number of subscribers may be coupled by wireless communications to a base station, and the base station is in turn coupled through an ATM switch to the high speed backbone network. The subscribers may be either stationary or mobile, and in the case of mobile subscribers, it may be necessary for the subscriber to communicate with a different base station from time to time, as a subscriber enters and leaves areas serviced by various base stations. In a wired network using an ATM backbone network, the users may be wired directly to ATM switches.

In the case of desktop computers, wired and wireless communications are usually supported by an appropriate interface board or "bus adapter" (e.g., S-bus, Nubus, ISA, PCI, EISA, or the like) installed inside the casing or housing of the computer, with suitable connector elements, or plugs, for a given wired network, or a suitable antenna to communicate with a wireless network, emerging exteriorally of the casing or housing. However, in order to switch from a wired network to a wireless network, it may be necessary to terminate a connection, if communication is currently in progress. That is, typically the steps would be: shut down the computer, remove the existing interface board, install a new interface board appropriate to the network to be used, and often provide new software for supporting the new interface. Adding to the problem, high level application software normally requires reconfiguration in order to utilize the changes in the network configuration.

In the case of laptop computers, communications are often provided by a network interface card, such as a PCMCIA type interface card, which is a relatively small, approximately credit card-sized element that physically enters a slot in a side panel of the laptop housing. However, these various network interface cards, or PCMCIA type cards, are specific to either wired or wireless networks, such that a communication session must terminate, the laptop shut down, and the network interface card changed to communicate with a new network. Again, it may also be necessary to provide new software to support the new interface card upon changing cards in this fashion.

Thus, the prior art has generally required multiple interface cards that must be interchanged, or other special configurations of equipment to allow a user device to change from wired to wireless communications networks. Modular interface cards such as ATM boards allow for users to plug in different modules for different types of wired connections; however, the user must still remove the interface cards from the host computer to change the module. Multiple modules cannot be connected to one interface board, and all modules supported utilize a wired medium. Thus, automatic switching between wired and wireless mediums is not possible with this approach.

BRIEF SUMMARY OF THE INVENTION

A media switching apparatus for automatically switching a user device between wired and wireless service medium of communications networks is disclosed and described. The apparatus includes a protocol stack that includes a network layer, a logical link control, a first set of lower layers associated with a wired service medium and a second set of lower layers associated with s wireless service medium. Further included is a selecting means, responsive to an availability of the wired service medium, for selecting the first set of lower layers to provide service for user device, and further responsive to a non-availability of the wired service medium and an availability of the wireless service medium for selecting said second set of lower layers to provide service for the user device.

A corresponding method embodiment for automatically switching a user of a communications network device, which includes wired hardware and wireless hardware, between wired and wireless service mediums includes the following steps. Determining whether a wired service medium is available and determining whether a wireless service medium is available. Activating the wired hardware to provide service to the user of a communications network device when the wired service medium is determined to be available and the wireless service medium is determined to be unavailable. Activating the wireless hardware to provide service to the user of a communications network device when the wireless service medium is determined to be available, and the wired service medium is determined to be unavailable.

BRIEF DESCRIPTION OF THE DRAWINGS

FIG. 1 is a functional diagram of an ATM network that may be accessed by both wired and wireless mediums, in accordance with the present invention;

FIG. 2 is a functional diagram of a modified protocol stack for use with both wired and wireless communication mediums, in accordance with the present invention;

FIG. 3 is a functional diagram illustrating selection of one of two sets of layers specific to wired and wireless mediums, respectively, in the protocol stack of FIG. 2;

DETAILED DESCRIPTION OF A THE PREFERRED EMBODIMENT

Figure 4:
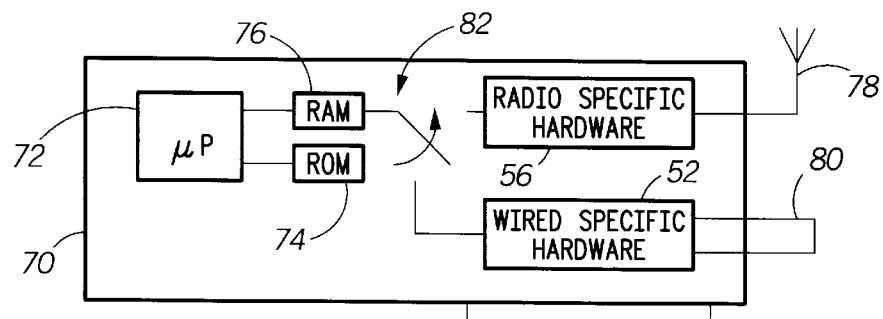
FIG. 4 is a block diagrammatic illustration of a network interface card showing hardware components for respective wired and wireless communication mediums, in accordance with a first embodiment of the invention.

Referring to the drawings and initially to FIG. 1, an asynchronous transfer mode (ATM) network is illustrated as a backbone network 10, made up of a plurality of ATM switches such as ATM switch 12, which are interconnected by fiber, cable or other suitable wired connection medium 14. A plurality of user devices 16, 18, 20, 22, 24, 26 and 28 are connected at the ATM switch 12, which forms a node of the ATM backbone network 10 by either wired or wireless communications or service mediums. In a preferred embodiment, the user device 28 is connected by a wired service medium 38 to the ATM switch 12.

The user devices 16, 18, 20, 22, 24, and 26 are served by wireless service mediums so as to communicate with respective base stations 30, 32. These base stations 30 and 32 in turn communicate with the ATM switch 12, preferably through wired facilities such as coaxial or fiber optic cables 34, 36. Each of the base stations 30, 32 may be assigned to service a given area represented by the ovals shown in FIG. 1. The arrangement is such that laptop computers or other mobile communication devices within the areas represented by the ovals in FIG. 1 may communicate with one of the base station 30 and the base station 32, with some overlap in these areas being possible, as illustrated by the area surrounding user devices 20 and 22.

While the invention will be described in detail herein with reference to a preferred embodiment—wherein a user device comprises a laptop computer—it will be understood that the invention is not necessarily limited to this application. Other applications, for example, a desktop computer, or any other user device that may communicate over various types of wired or wireless communications or service networks may also make use of the present invention. The present invention encompasses an automatic medium switching apparatus and method by which any of the user devices 16–28 may communicate with the backbone network 10 using either wired or wireless service mediums, and may switch between wired and wireless service mediums, in accordance with predetermined criteria for selecting and utilizing either a wired or a wireless service medium. While an ATM network was described above, the invention may be used with other networks, such as Ethernet. Both ATM and Ethernet may also support wireless network communications products, one example of which in an ATM environment is illustrated and described above with reference to FIG. 1. Further examples of wireless networks include Code Division Multiple Access (CDMA) and Global System for Mobile Communications (GSM). GSM is a European cellular (wireless) communications system, while CDMA is a wireless communications technique presently used in parts of Asia.

Referring to FIG. 2, a modified protocol stack for use with both wired and wireless communications or service mediums, in accordance with the invention, is illustrated. At the highest layer is the Application 40 to be served by the communication network, for example, voice communications, data communications, text, video, etc. The protocol stack further comprises a network layer 42 and a logical link control layer 44. These two layers are common to both wired and wireless communication service mediums. Briefly, these two layers handle packetization of data, framing, buffering of data, and similar data processing functions for allowing data communication between devices over the ATM network or any other network selected for communications. Further descriptions of the functions of network layer and logical link control layer and the above functions of packetization framing, buffering, etc. may be found in the publications Telecommunications Networks, Protocols, Modeling, and Analysis by Mischa Schwartz, Addison-Wesley Publishing Co., 1988; Data Networks by Dmitri Bertsekas and Robert Gallager, Prentice Hall, 1992; and Internetworking with TCP/IP, Vol. 1 by Douglas Comer, Prentice Hall, 1991.

Below the logical link control 44, two sets of lower layers, which are respectively specific to wired and wireless service mediums, are provided, and designated in FIG. 2 generally by the reference numerals 46 and 48. The first set 46 of lower layers is specific to a wired service medium and comprises a wired media access (MAC) layer 50 and a wired physical layer 52. The wired physical layer 52 represents hardware specific to connection to a wired service medium, including a suitable physical connector or terminal that may project externally from the user device for connection to a mating connector on a cable or other wired input to the wired service medium.

The respective network, logical link control and media access layers 42, 44 and 50 are primarily embodied in software that may be run on suitable processor components for performing the various functions assigned to each layer. In this regard, the MAC layer 50 is responsible for such functions as collision detection, that is, detecting two users transmitting simultaneously to avoid collision between the data from two such users as it enters the network. A further description of the makeup and function of the MAC layer may be found in the above referenced publications.

Referring to the second set of lower layers 48, they comprise a wireless MAC layer 54 and wireless physical layer 56 specific to a wireless service medium. The structure and functions of the wireless MAC layer 54 are analogous to those of the wired MAC layer 50, as described above. The wireless physical layer 56 may include radio transmission and reception components and a suitable antenna for communication with a wireless service medium. In addition to the MAC and physical layers 54, 56 the second set of lower layers includes a wireless mesh layer 58 (described below), which may be embodied primarily in software and executed by suitable processor components.

The mesh layer 58 is specific to wireless service mediums and controls, for example, which user device connects to which base station, such as in the network described with reference to FIG. 1. The mesh layer 58 also controls and handles hand-offs between base stations and routing from the backbone network to the correct base station to complete communications of data between respective user devices coupled with the network. Essentially, the mesh layer 58 does everything necessary to facilitate communications between two user devices in a wireless environment. Further description of the structure and functions of a mesh layer of this type may also be found in the above-referenced publications.

Referring to FIG. 3, a functional diagram shows an automatic media or network switching apparatus that includes a selector or selecting means 60, which is responsive to the availability of a wired service medium for selecting the first set 46 of lower layers or "wired layers", as they are designated in FIG. 3. Similarly, the selector 60 is responsive to the non-availability of a wired service medium and the availability of a wireless service medium for selecting the second set 48 of lower layers or "wireless layers", as they are designated in FIG. 3.

The selector or selecting means 60 might comprise suitable sensing hardware and software for determining the presence or absence of various wired or wireless service mediums. The sensing of a wired service medium can be accomplished by carrier sensing methods, as indicated at reference numeral 62 in FIG. 3. The selector 60 also includes suitable software for making a determination of which network (wired or wireless) is to be selected in accordance with predetermined criteria, and suitable processor components for executing the software necessary to this function. In this latter regard, the selector 60 may share processor components with other functions of the user device.

The foregoing description of operation of the selecting means or selector 60 based only upon availability of wired or wireless mediums is in accordance with the simplest or most basic form of the invention. In accordance with a preferred form of the invention, the selector or selecting means 60 will further be responsive to the acceptability or suitability of various wired and wireless service mediums that may be available, in addition to determining the availability of such mediums, so as to select either a wired or a wireless service medium for particular applications, in accordance with predetermined criteria. Thus, for applications in which a wired service medium is preferred, the selecting means will include means responsive to a wired service medium becoming available, even while using a wireless service medium, for switching between the wireless layers (second set of lower layers) 48 and the wired layers (first set of lower layers) 46.

With respect to the switching between the two sets of lower layers 46 and 48, the wireless mesh layer 58 also includes means for handling hand-off and routing protocols for switching between layers and for signaling the network and logical link control layers 42 and 44, respectively, as well as notifying the application 40 when a switch between media has occurred.

In accordance with a preferred embodiment, the mesh layer 58 also includes means for notifying the user device of information regarding the availability of a wireless network (i.e., whether the user device is within the range of a compatible wireless network service provider, such as a base station 30 or 32 of the system illustrated in FIG. 1). In this regard, an additional human perceptible means is preferably employed and signaled by the mesh layer in order to so notify the user of such information. This human perceptible indication may take the form of a simple LED or other such light emitting element, or may take the form of producing a message on a screen of a laptop computer or other user device which utilizes a video display.

Referring now to FIG. 4, there is illustrated in diagrammatic form a network interface card 70 (also known as a PCMCIA interface adapter) that may be provided as a specific embodiment of the invention for use with a laptop computer. Briefly, a typical laptop computer includes one or more externally accessible slots that receive one or more interface cards or adapters, which generally are about the size of a credit card (although usually several times as thick). These interface cards contain all the components necessary for a particular function, such as providing a fax modem, etc. However, prior network interface cards were specific to only a single type of network and did not permit switching between wired and wireless networks as with the present invention.

In accordance with the invention, the network interface card 70 includes suitable components such as a microprocessor 72 and memory in the form of both read only memory (ROM) 74 and random access memory (RAM) 76. These components may embody the hardware and software components of the network layer 42 and logical link control layer 44 described above with reference to FIG. 2. These components may further embody the hardware and software associated with the two sets of lower layers 46 and 48, with the exception of the wired physical layer 52 and wireless physical layer 56.

In this regard, the wireless, or radio, specific hardware and wired specific hardware, which comprise the aforementioned layers 52 and 56, are separately provided on the card 70 and designated by like reference numerals 52 and 56. The radio specific hardware may include an externally extending antenna component 78 and the wired specific hardware 56 may include an externally projecting connector member 80, as previously discussed hereinabove. A software controlled switch 72 is provided to select the appropriate physical layer or hardware when either wired or wireless service mediums are selected, in accordance with predetermined criteria as will be described further hereinbelow.

As indicated above, the network interface card 70 includes hardware to support both wired and wireless (radio) connections. Software on the device will enable the card to switch between either wired or wireless services in a seamless, transparent manner. To provide this functionality, the interface card 70 includes a switch 82 implemented in software that controls which hardware is being utilized. The specific hardware utilized by the radio or wired link will perform all the necessary "packetization" required by the network protocol being utilized. The data sent across the switch is formatted to the higher network layers' specifications, but typically requires additional formatting for compatibility with the specific network being utilized.

Figure 5:
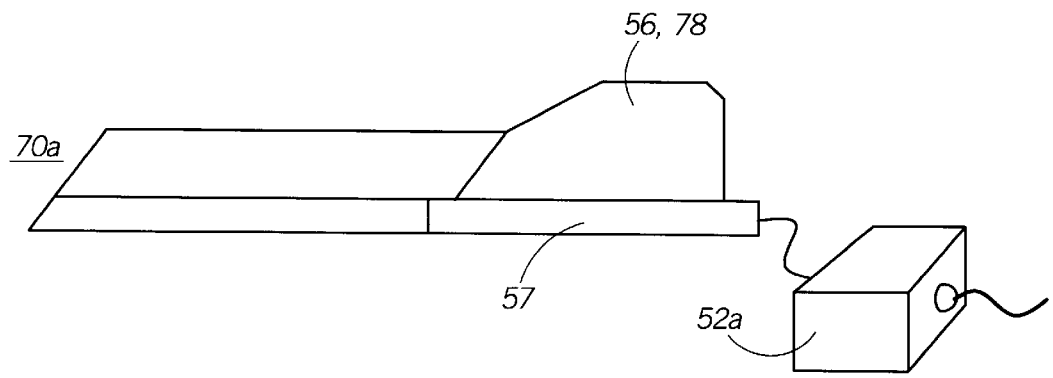
FIG. 5 is a simplified side elevation of a network interface card, wherein wired specific hardware is provided off the card, in accordance with another embodiment of the invention.

Referring briefly to FIG. 5, a somewhat simplified side elevation of a network interface card is shown, designated generally by reference numeral 70a. As indicated in FIG. 5, it is also within the scope of the invention to provide the wired specific hardware, that is, the additional hardware needed to make a wired connection, off the network interface card 70a. This hardware for making a wired network connection is designated in FIG. 5 by reference numeral 52a. Also in FIG. 5, an additional card interface 57, which bypasses the radio specific hardware 56 (including antenna 78), is used to interface with the wired specific hardware 52a. In other respects, the embodiment of FIG. 5 is substantially identical to what is shown and described above with reference to FIG. 4. Thus, in the description that follows, the apparatus, or device, is understood to include both the network interface card 70 as shown in FIG. 4, and the network interface card 70a together with the additional off-card wired specific hardware 52a as shown in FIG. 5.

According to the invention, the device can detect when it is connected to a wired network backbone using carrier sensing techniques; i.e., by sensing a carrier signal of the network. After detecting the presence of a wired network the invention will determine if the network is "compatible" or connected to the information, servers, and/or sites that are desired by the user. The word "ping," as used herein, refers generally to a process and program for testing the reachability of destinations by transmitting a signal that requests a reply, and waiting for a reply. Processes and programs of this type are available for various networking protocols.

In the case where a wireless connection is in progress, the wired network is utilized to "ping" the base station. This will determine if the appropriate network routing is available to maintain all the user's wireless connections. The results of the ping operation and other user preferences are then used to determine if a switch between networking services should be performed.

Similarly, the radio hardware 56 is constructed in such a manner that it will automatically detect a base station or other transmitting node to which connection can be made. In the case where a wired connection is in progress, the wireless connection is utilized to "ping" an appropriate network station with which the device is communicating via the wired link. This will determine if the appropriate network routing is available to maintain all the users' wired connections. The device utilizes the result of the ping operation and other user preferences to determine if a switch between networking services should be performed.

For the case when neither wired nor wireless services is being utilized, but the networks are detected, the device "pings" the appropriate, predetermined (based on user preferences) network stations to determine if either network service is available and compatible. Then, based on user preferences, the device determines the preferred connection, in accordance with the present invention as described below.

OPERATION

At a high level, the automatic media or network switching method (and the apparatus or device employing the method) has five states of operation. These states will be described independently in the following sections to enhance clarity, with reference to the diagram of FIG. 6 and to the flow charts that follow (FIGS. 7–10).

State 0 (600)—Determine Services (Searching)

When the user device is started up (i.e., first turned on, or when no communications services are present), the device enters a "search" mode. In this mode the device continually attempts to detect a base station via a wireless link, and checks for the presence of a wired connection. The device stays in this state until either of the services is available. If both of the services become available at the same time the device enters State 3 (603), the Service Evaluation state.

Figure 6:
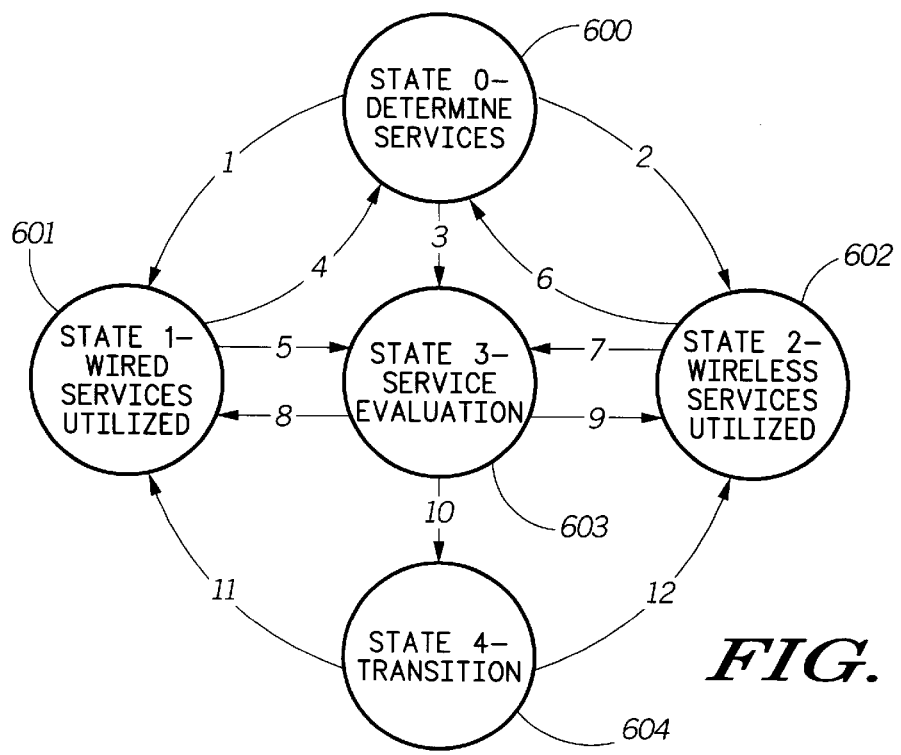
FIG. 6 is a diagram illustrating a plurality of operational states, in accordance with the invention, and the interoperation therebetween.
Figure 7:
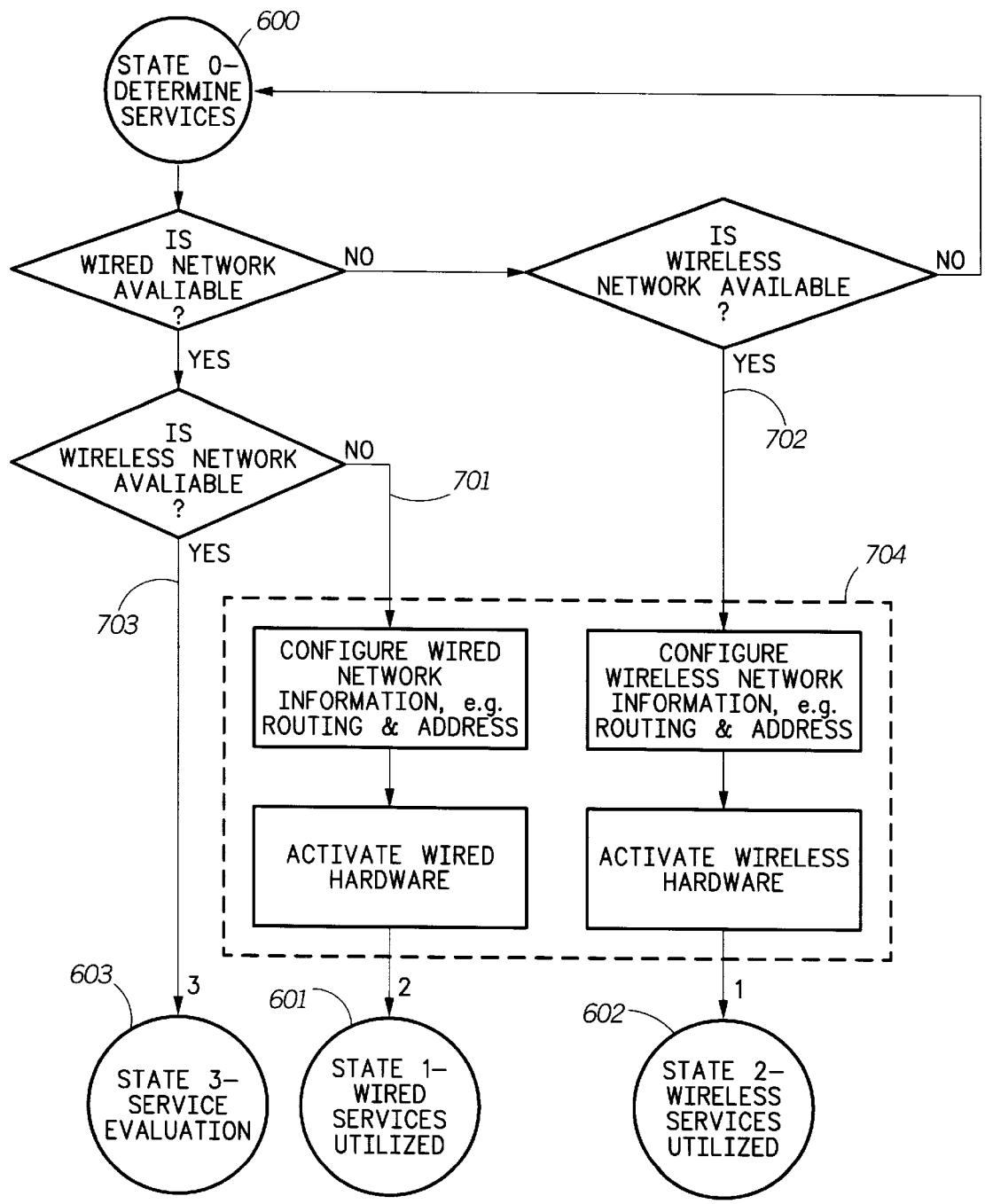
FIGS. 7–10 are flow charts depicting operation of the apparatus and method in accordance with the invention, using the operational states of FIG. 5.

FIG. 7 shows a flow chart for operation while in State 0 (600). It should be pointed out that upon leaving State 0 (600), the device is either connected to the wired network (701), connected to the wireless network (702), or both services are available (703) and the device enters State 3 (603). In this regard, the transitions between states are labeled with reference character 1–12 in FIG. 6, and these same reference characters are repeated at corresponding transition points in FIGS. 7–10.

When the device is utilizing a wired or a wireless connection, it has completed the necessary steps to perform a connection setup. At a minimum, this includes configuring the wired/wireless network information and activating the wired/wireless hardware (704), as shown in FIG. 7. Setup may further include, for example, virtual circuit assignment in the case of an ATM network and assigning of a network address to the card 70 (70a) and the host computer.

State 1 (601)—Wired Services Utilized

Figure 8:
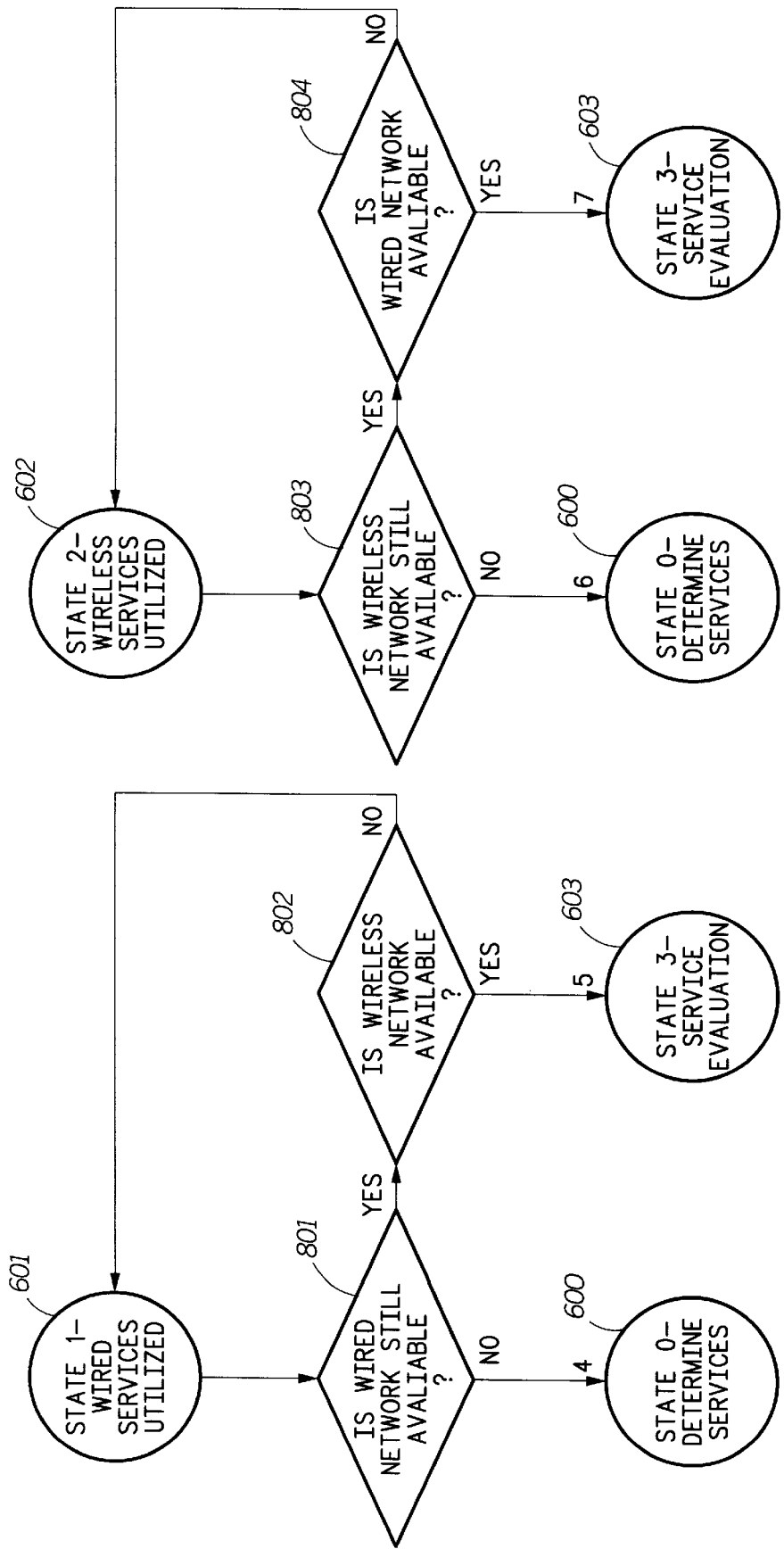

Referring to FIG. 8, State 1 (601) is entered when a compatible wired service medium or network connection is sensed and being utilized or when a wired connection is being utilized after determining that it is the preferred connection when the wireless service medium is also available. In this state the device has detected, via the appropriate carrier signal, that it is connected to a compatible wired backbone and has performed the necessary steps to utilize this networking connection.

Accordingly, the present invention allows the user and supporting software to communicate to the network via the wired link (801), while periodically attempting (802) to detect a base station via a wireless link.

State 2 (602)—Wireless Services Utilized

Referring still to FIG. 8, State 2 (602) is entered when a wireless link to a base station is established with a compatible backbone network or when a wireless service medium or connection is being utilized after determining that it is the preferred connection when a wired service medium is also available. In this state the device has detected a wireless base station and has determined that it is connected to a compatible backbone network. The interface card 70 (70a) has also performed the necessary steps to utilize this networking connection.

Accordingly, the present invention allows the user and supporting software to communicate to the network via the wireless service medium (803), while periodically attempting (804) to connect to a wired service medium.

For both States 1 and 2, the device remains in the state until either the network connection via this service medium is unavailable, causing a return to State 0 (600), or until the other service medium becomes available, causing a return to State 3 (603), where the two service mediums are evaluated. FIG. 8 shows flow charts for both States 1 and 2.

It is noted that State 3 (603) is entered in the event that both wired and wireless service mediums become available. In this state the device determines, based on network loading and throughput, and user options for quality of service, i.e., the desired throughput (bit rate), latency, and jitter (latency variance), which service medium should be selected.

When entering State 3 (603) from either State 1 (601) or State 2 (602), the existing service medium network connection is maintained while determining which of the service mediums is desired. In other words, the user's services will not be interrupted or disconnected while monitoring for the connection quality of the other service medium.

State 3 (603)—Service Evaluation

Figure 9:
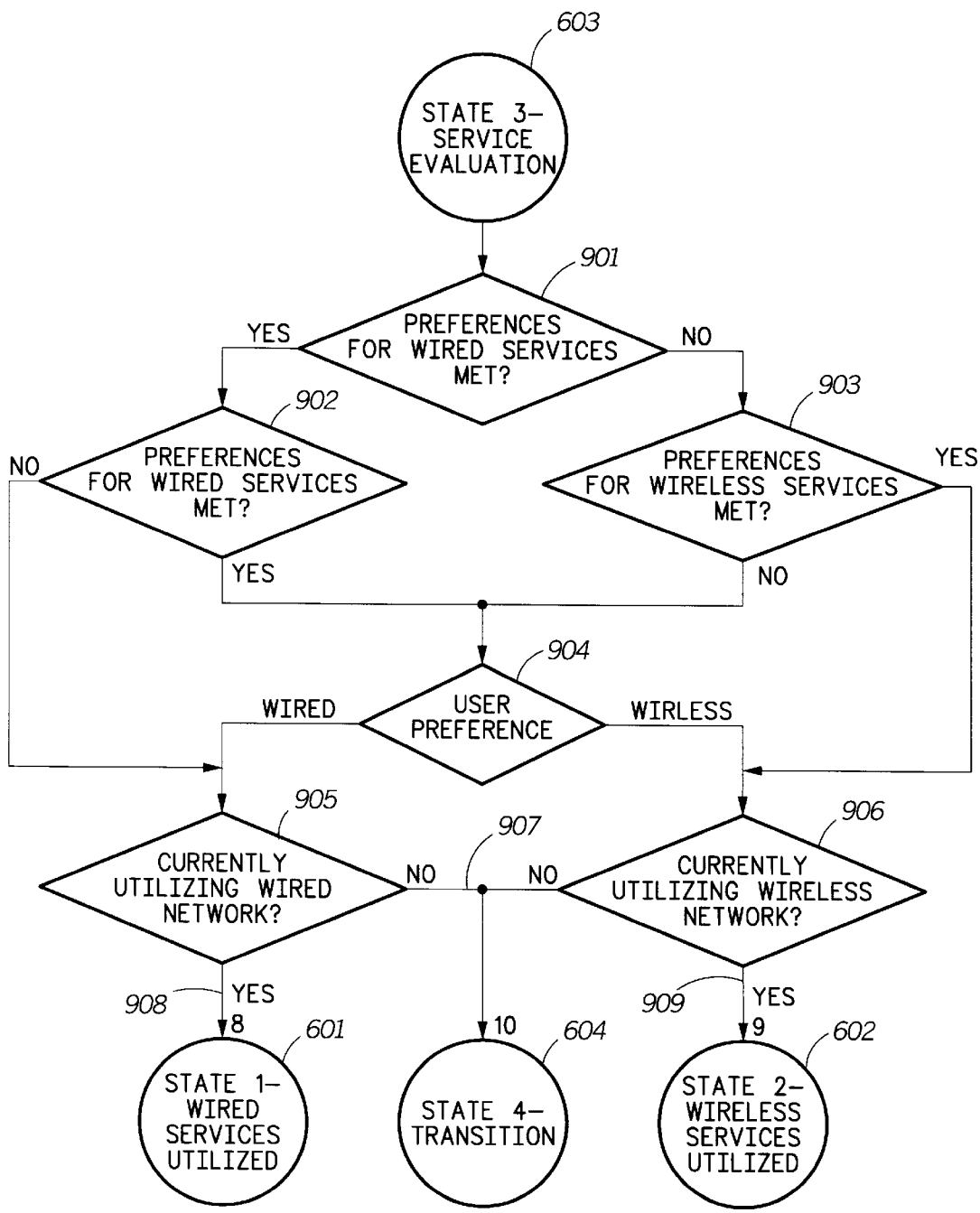

FIG. 9 shows a flow chart for State 3 (603). Since both wired and wireless service mediums are available when this state is entered, the device leaves this state connected to one of the service mediums. A series of decisions (901–906) to are executed to determine whether a medium switch is warranted, or desired by the user, using predetermined criteria. In this manner, the device can either determine that the service medium should be switched (907), or remain with the current service medium by returning (908, 909) to either State 1 (601) or State 2 (602). At the completion of the State 3 (603), a timer in the device is set and the device remains in either State 1 (601) or State 2 (602) until this timer expires. This substantially prevents the device from toggling between networks when both networks are available. When the device determines that the service medium should be switched, it enters State 4 (604), the Transition State.

State 4 (604)—Transition

Figure 10:
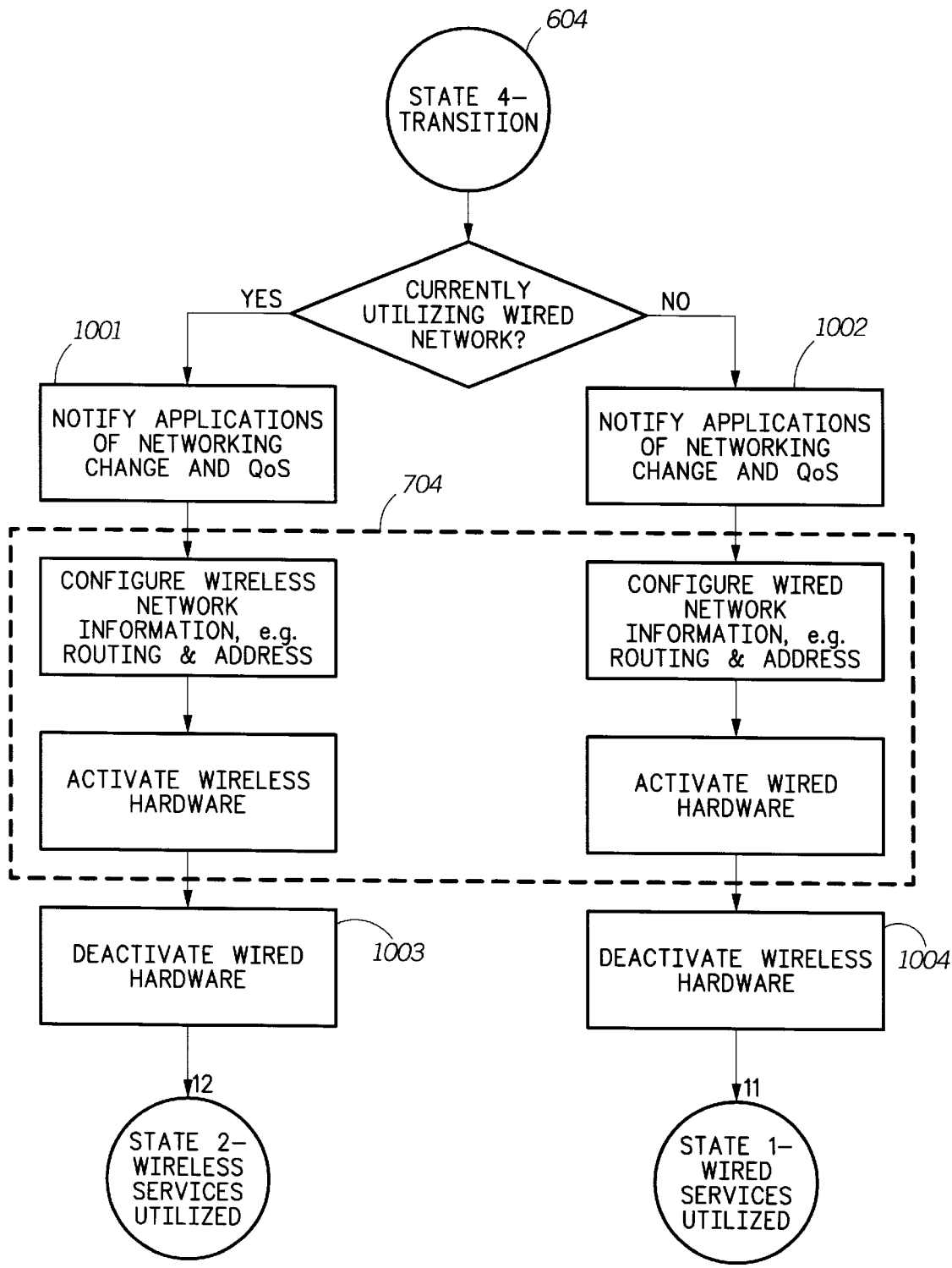

When it has been determined that the device should transition from one service medium to the other, the device enters State 4 (604). The flow chart of FIG. 10 depicts the operation of State 4 (604).

In this state, the device allows the user and supporting software to communicate to the network via the service medium determined to be preferred in the Service Evaluation state (603), while maintaining network connections via the alternative service medium. In this manner, the device is able to seamlessly transition from one service medium to the other. The Applications are notified of a change of network ("Networking Change") and of the acceptability or Quality of Service (QoS) of each available network (1001, 1002). Before exiting, the hardware for the previously used configuration is deactivated (1003, 1004), so that the new medium is exclusively active.

As previously noted, the state transition diagram of FIG. 6 shows all the transitions that might be encountered. These are described briefly below. These state transitions are also shown on the flow charts of FIGS. 7–10, and the numbers below correspond to the numbers used at the points of transition in FIG. 6 and in FIGS. 7–10.

1) State 0 (600) to State 1 (601)—The device determines that the only service medium available is wired, and configures the system to utilize a wired connection.

2) State 0 (600) to State 2 (602)—The device determines that the only service medium available is wireless and configures the system to utilize a wireless connection. 3) State 0 (600) to State 3 (603)—The device has detected the presence of both wired and wireless service mediums and must, based on user preferences, determine which service mediums to utilize.

4) State 1 (601) to State 0 (600)—The wired service medium/network connection is no longer available.

5) State 1 (601) to State 3 (603)—The user device was utilizing a wired service medium when the presence of a wireless service medium is sensed. The device now detects the presence of both service mediums and, based on user preferences, determines which service medium to utilize.

6) State 2 (602) to State 0 (600)—The wireless service medium/network connection is no longer available.

7) State 2 (602) to State 3 (603)—The user device is utilizing the wireless service medium when the presence of a wired network is sensed. The device now detects the presence of both service mediums and must, based on user preferences, determine which service medium to utilize.

8) State 3 (603) to State 1 (601)—Based on user preferences, the device has determined to maintain the wired service medium instead of switching to the wireless service medium.

9) State 3 (603) to State 2 (602)—Based on user preferences, the device has determined to maintain the wireless service medium instead of switching to the wired service medium.

10) State 3 (603) to State 4 (604)—Based on user preferences, the device has determined to switch from the current service medium/network connection to the alternative.

11) State 4 (604) to State 1 (601)—The device has performed the necessary steps to switch, transition, from using a wireless service medium/network connection to a wired service medium/network connection.

12) State 4 (604) to State 2 (602)—The device has performed the necessary steps to switch or transition from using a wired service medium/network connection to a wireless service medium/network connection.

As mentioned above, the present invention can also be embodied in other wireless systems, namely, CDMA and GSM. For both of these systems, switching between wired and wireless services is handled in a manner similar to a wireless hand-off between two base stations. In both cases, this operation can be performed in a way that is also seamless, or transparent, to the specific networking topology.

When the device, as used for CDMA or GSM, has determined that a switch to the alternative networking type is required, i.e., the device has entered state 4, the device will signal for a hand-off. The device will trigger the hand-off by reporting that the signal strength for the wired connection is higher than the signal strength of any reporting base stations. The higher level networking layers operate substantially the same as those discussed in previous sections.

What is claimed is:

1. A media switching apparatus for automatically switching a user device between wired and wireless service mediums of communications networks, comprising:

a protocol stack that includes a network layer, a logical link control, a first set of lower layers associated with a wired service medium and a second set of lower layers associated with a wireless service medium; and selecting means, responsive to an availability and compatibility of the wired service medium, for selecting the first set of lower layers to provide service for the user device, and further responsive to a non-availability or non-compatibility of the wired service medium and an availability and compatibility of the wireless service medium for selecting said second set of lower layers to provide service for the user device.

2. The apparatus according to claim 1, wherein said selecting means further includes means, responsive to a first wired service medium becoming available while using a first wireless service medium, for switching between said second set of lower layers and said first set of lower layers.

3. The apparatus according to claim 2, wherein said selecting means further includes carrier sensing means for sensing a carrier signal of a communications network.

4. The apparatus according to claim 1, wherein said first set of lower layers comprises a wired media access layer and a wired physical layer.

5. The apparatus according to claim 4, wherein said wired physical layer includes a connector configured for connection to a mating connector of a given wired service medium.

6. The apparatus according to claim 4, wherein said second set of lower layers comprises a wireless media access layer and a wireless physical layer.

7. The apparatus according to claim 6, wherein said second set of lower layers further comprises a wireless mesh layer.

8. The apparatus according to claim 1, wherein said second set of lower layers comprises a wireless media access layer and a wireless physical layer.

9. The apparatus according to claim 8, wherein said wireless physical layer includes a radio antenna.

10. The apparatus according to claim 8, wherein said second set of lower layers further comprises a wireless mesh layer.

11. The apparatus according to claim 10, wherein said wireless mesh layer further comprises means for handling hand-off and routing protocols used to switch between said second set of lower layers and said first set of lower layers, and means for signaling the logical link control and the network layer when switching has occurred.

12. The apparatus according to claim 11, wherein said wireless mesh layer is operatively coupled to higher level applications and to said selecting means, and includes means for notifying said higher level applications when switching between a wired service medium and a wireless service medium has occurred.

13. The apparatus according to claim 1, further comprising a mesh layer that is responsive to the availability of a wireless service medium, which mesh layer includes means for notifying a user of the apparatus with information regarding the availability of a wireless service medium.

14. The apparatus according to claim 1, wherein said selecting means further includes service evaluation means responsive to the presence of both wired and wireless service mediums for determining which of said first and second sets of lower layers to select, based on predetermined criteria.

15. The apparatus according to claim 14, wherein said selecting means further includes polling means, responsive to selection of the second set of lower layers, for periodically determining whether a wired service medium has become available.

16. The apparatus according to claim 1, wherein said selecting means further includes means responsive to selection of said first set of lower layers for periodically determining whether a wireless service medium has become available.

17. A method for automatically switching a user of a communications network device, which includes wired hardware and wireless hardware, between wired and wireless service mediums comprising the steps of:

determining whether a wired service medium is available and compatible;

determining whether a wireless service medium is available and compatible;

activating the wired hardware to provide service to the user of a communications network device when the wired service medium is determined to be available and compatible and the wireless service medium is determined to be unavailable or not compatible; and activating the wireless hardware to provide service to the user of a communications network device when the wireless service medium is determined to be available and compatible, and the wired service medium is determined to be unavailable or not compatible.

18. The method according to claim 17, further including the step of, prior to the step of activating the wired hardware, configuring wired network information, and, prior to the step of activating wireless hardware, configuring wireless network information.

19. The method according to claim 17, further including the step of evaluating wired and wireless service mediums when both wired and wireless service mediums are determined to be available.

20. A method according to claim 19, further including, following the steps of activating one of wired and wireless hardware:

continuously determining an availability of both wired and wireless service mediums;

continuing to utilize a wired service medium when a wired service medium is determined to be available and a wireless service medium is determined to be unavailable;

continuing to utilize wireless services when a wireless service medium is determined to be available and a wired service medium is determined to be unavailable; and entering an evaluation state, responsive to the step of continuously determining, when both wired and wireless service mediums are determined to be available.

21. A method according to claim 20, further comprising the step of entering said transition state, which includes the steps of:

notifying higher level applications of a networking change;

configuring one of wireless and wired network information, depending on a selected network medium;

activating one of wireless and wired hardware; and deactivating the other of wired and wireless hardware.

22. A method according to claim 19, wherein the step of evaluating further includes the steps of:

determining whether predetermined preferences for wired services are met;

determining whether predetermined preferences for wireless services are met;

determining the existence of a user preference for one of wired and wireless services;

deciding that one of wired and wireless service mediums should be utilized based upon all of said determining steps;

determining which of wired and wireless service mediums is currently being utilized; and entering a transition state when neither wired nor wireless services are currently being utilized.

23. A media switching apparatus for automatically switching a user device between wired and wireless service mediums of communications networks, comprising:

a protocol stack that includes a network layer, a logical link control, a first set of lower layers associated with a wired service medium and a second set of lower layers associated with a wireless service medium;

selecting means, responsive to an availability of the wired service medium and an availability of the wireless service medium, for selecting one of said first set of lower layers and said second set of lower layers to provide service for the user device; and said selecting means further including service evaluation means responsive to the said availability of wired and wireless service mediums for determining which of said first and second sets of lower layers to select, based on predetermined criteria.

24. The apparatus according to claim 23, wherein said selecting means further includes polling means, responsive to selection of the second set of lower layers, for periodically determining whether a wired service medium has become available.

* * * * *